United States Patent [19]

Iwata

[11] Patent Number: 5,202,714
[45] Date of Patent: Apr. 13, 1993

[54] FINDER OPTICAL SYSTEM

[75] Inventor: Noriyuki Iwata, Fujisawa, Japan

[73] Assignee: Ricoh Company, Ltd., Tokyo, Japan

[21] Appl. No.: 827,430

[22] Filed: Jan. 29, 1992

[30] Foreign Application Priority Data

Jan. 29, 1991 [JP] Japan .................................. 3-29316

[51] Int. Cl.[5] ............................................ G03B 13/02
[52] U.S. Cl. .................................. 354/219; 354/221; 354/225
[58] Field of Search ............... 354/219, 221, 222, 224, 354/225, 223, 166, 199; 352/171

[56] References Cited

U.S. PATENT DOCUMENTS

| | | | |
|---|---|---|---|
| 3,610,123 | 10/1971 | Bellows | 354/219 |
| 3,643,574 | 2/1972 | Moriyama et al. | 354/219 |
| 4,081,809 | 3/1978 | Kuboshima | 354/199 |
| 4,165,932 | 8/1979 | Asano et al. | 354/219 |

FOREIGN PATENT DOCUMENTS 2-234111 9/1990 Japan .

*Primary Examiner*—Monroe H. Hayes
*Attorney, Agent, or Firm*—Fish & Richardson

[57] ABSTRACT

A finder optical system of a camera comprises a main finder and an auxiliary finder. The main finder is constructed by a real image type finder having a main finder objective lens, an ocular lens system, and an optical system disposed between the main finder objective lens and the ocular lens system for forming an erect real image. An optical axis of the main finder objective lens is perpendicular to a vertical symmetry axis of an image pickup lens of the camera and is parallel to an optical axis of the image pickup lens. The auxiliary finder is constructed by a real image finder having an auxiliary finder objective lens and another optical system disposed between the auxiliary finder objective lens and the ocular lens system for forming an erect real image. An optical axis of the auxiliary finder objective lens is perpendicular to a lateral symmetry axis of the image pickup lens and is parallel to the optical axis of the image pickup lens. Another optical system is adapted in such a manner that an optical path of the auxiliary finder is led nearly on a real image forming plane of the main finder into a part of an optical path of the main finder.

8 Claims, 4 Drawing Sheets

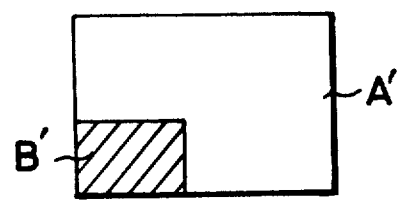
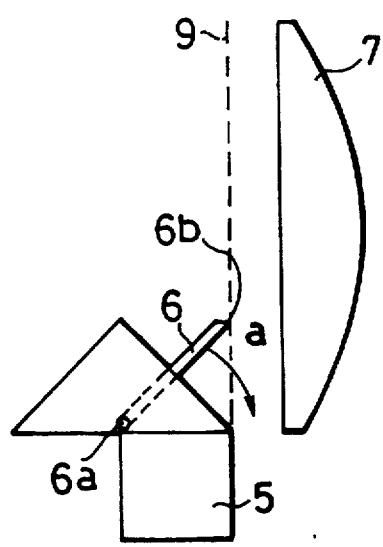
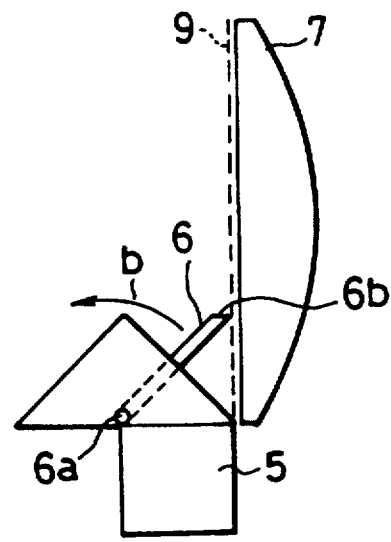

FINDER OPTICAL SYSTEM

BACKGROUND OF THE INVENTION

1. Field of the Invention

The present invention relates to a finder optical system for use in a silver salt processing camera, an electrically imaging camera and the like.

2. Description of the Related Art

In the field of the art for silver salt processing cameras and electrically imaging cameras and the like, there has been a wide use of the finder optical system which is structured independently from the image pickup lens system, in order to easily make the cameras compact and light-weight.

Since a camera of this kind, that is, so called compact camera (mostly being equipped with a lens shutter), has a separate finder objective lens for a finder optical system from an image pickup lens system, there arises a difference or shift between the two optical axes of the respective optical systems. This fact causes the disadvantage that two optical systems do not frame exactly the same view, making the view field of the finder different from the range to be taken and this will be of much significance and should be counted when the distance between a subject and the camera is short. This defective effect is called as parallax and has brought about difficulty in the art of the compact camera.

In order to eliminate this defect, there was proposed a camera apparatus which synthesizes the image signals from two image sensors disposed symmetrically with respect to the optical axis of the image pickup optical system, to thereby display an image free from parallax (Japanese Patent Application Laying Open (KOKAI) No. 63-121831). But since this camera apparatus employs image sensors, a complicated unit is needed for making and observing a colored taking image, thus increasing its cost. Moreover, observing the image to be taken, necessitates continuous use of electric power, resulting in a high consumption of battery.

For the reasons stated above, most cameras of this kind have dealt with taking a short-range picture by providing for the finder view field a parallax compensation mark at all times, or by providing a movable frame of view field for the finder optical system. However, these methods still exhibit a difficulty that the positional relationship between a subject to be taken and the background and foreground can not be obtained through the finder optical system.

SUMMARY OF THE INVENTION

The present invention has been achieved under consideration of what is discussed above, and therefore an object of the present invention is to provide a finder optical system which can provide information on an image pickup frame free from parallax, in spite of being independent from the taking lens system.

The object of the invention can be achieved by a finder optical system of a camera, comprising a main finder constructed by a real image type finder having a main finder objective lens, an ocular lens system, and an optical system disposed between the main finder objective lens and the ocular lens system for forming an erect real image, an optical axis of the main finder objective lens being perpendicular to a vertical symmetry axis of an image pickup lens of the camera and being parallel to an optical axis of the image pickup lens, and an auxiliary finder constructed by a real image finder having an auxiliary finder objective lens and another optical system disposed between the auxiliary finder objective lens and the ocular lens system for forming an erect real image, an optical axis of the auxiliary finder objective lens being perpendicular to a lateral symmetry axis of the image pickup lens and being parallel to the optical axis of said image pickup lens, the another optical system being adapted in such a manner that an optical path of the auxiliary finder is led nearly on a real image forming plane of the main finder into a part of an optical path of the main finder.

According to the present invention, not only a view field is observed through the main finder but also another view field through the auxiliary finder can be observed in the same field. In addition, the view field observed through the main finder can be free from parallax in a lateral direction of the camera, and another view field observed through the auxiliary finder can be free from parallax in a vertical direction of the camera. Accordingly, the observer can observe both the laterally parallax-free view field and vertically parallax-free view field simultaneously to know a parallax-free image frame.

Preferably, the optical axis of the main finder objective lens crosses the vertical symmetry axis of the image pickup lens, also the optical axis of the auxiliary finder objective lens crosses the lateral symmetry axis of the image pickup lens.

Further, the optical system can comprise a combination of reflecting members. The reflecting members can comprise a full-reflecting mirror, a reflecting rectangular prism member, and another full-reflecting mirror. Preferably, another full-reflecting mirror is made to be pivotable and retractable about a pivoting axis thereof so as to change a reflection angle.

As a result, when the parallax is negligible, that is, the subject is located enough away from the camera, the observation is made using only the view field, whereas when the parallax is not negligible, that is the subject is located close to the camera, the observation can be made by using both the view field and another view field in order that the observer knows the proper taking image frame.

Further objects and advantages of the present invention will be apparent from the following description, reference being had to the accompanying drawings wherein preferred embodiments of the present invention are clearly shown.

BRIEF DESCRIPTION OF THE DRAWINGS

FIG. 2 is a schematic view of a view field of the finder of the first embodiment according to the present invention;

FIGS. 3a and 3b are side views of elemental parts of a supplemental finder of the first embodiment according to the present invention;

DESCRIPTION OF THE PREFERRED EMBODIMENTS

Embodiments of the present invention will be described in detail with reference to accompanying drawings.

In relation to the structures and operations and the aforementioned objects and novel features as well as other objects and novel features which are easily understood from this specification, disclosures and drawings are simplified or not illustrated for the purpose of avoiding complicated explanation.

Figure 6:
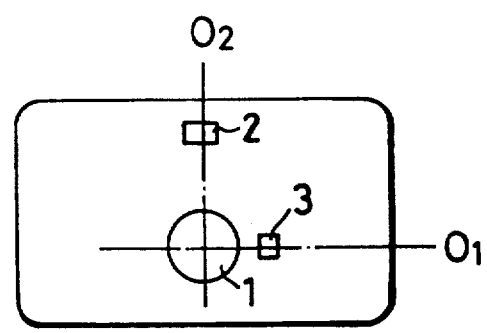
FIG. 6 is a schematic front view of a camera equipped with a finder optical system according to the present invention.

FIG. 6 shows a schematic front view of a camera equipped with a finder optical system of the present invention. The finder optical system of the present invention comprises a main finder A, and an auxiliary finder B. As shown in FIG. 6, when referring to a vertical symmetry axis of an image pickup lens 1 of the camera which is put in the normal position as vertical lens axis $O_2$, there are disposed a main finder objective lens 2 being lined up in the vertical lens axis $O_2$ with respect to the image pickup lens 1, and when referring to a horizontal symmetry axis of the same image pickup lens 1 as lateral lens axis $O_1$, there are disposed an auxiliary finder objective lens 3 being lined up in the lateral lens axis $O_1$ with respect to the image pickup lens 1.

Figure 1:
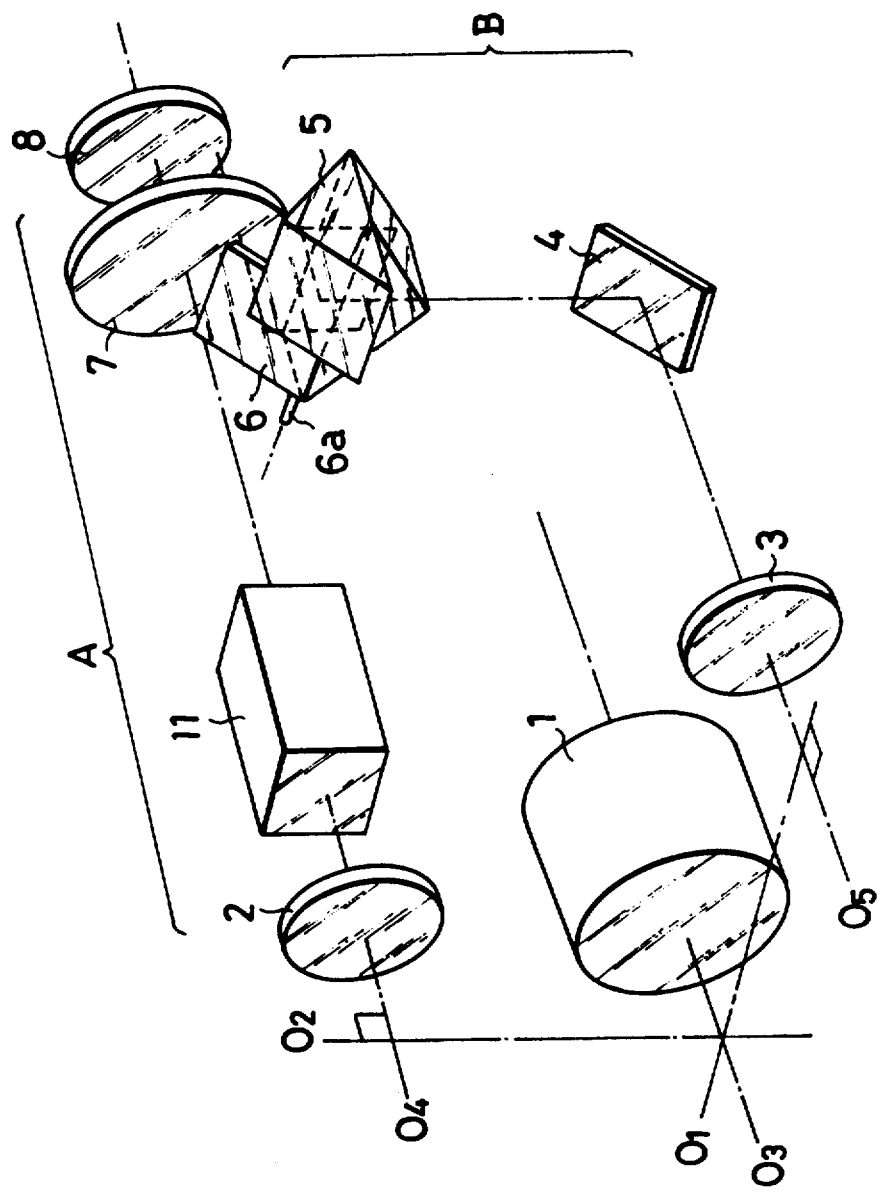
FIG. 1 is a schematic perspective view of a finder optical system of the first embodiment according to the present invention.

The main finder A is, as shown in FIG. 1, constructed by a real image type finder having the main finder objective lens 2, an ocular lens system comprising a condenser lens 7 and an eyepiece 8, and an optical system unit 11 disposed between the objective lens 2 and the ocular lens system for forming an erect real image for the finder. Thus constructed main finder A is arranged such that the optical axis $O_4$ of the main finder objective lens 2 crosses the vertical lens axis $O_2$ at right angles and is in parallel with the image pickup lens optical axis $O_3$.

On the other hand, the auxiliary finder B is, as shown in FIG. 1, constructed by another real image type finder having the auxiliary finder objective lens 3, the ocular lens system comprising the condenser lens 7 and the eyepiece 8, and an optical system disposed between the objective lens 3 and the ocular lens system for forming an erect real image for the finder. Thus constructed auxiliary finder B is arranged such that the optical axis $O_5$ of the auxiliary finder objective lens 3 crosses the lateral lens axis $O_1$ at right angles and is in parallel with the image pickup lens optical axis $O_3$.

Here, it should be noted that the ocular lens system of the auxiliary finder B shares the same ocular lens system with the main finder, that is, they have one ocular system consisting of the condenser lens 7 and eyepiece 8 in common.

The erect real image forming optical system in the auxiliary finder B is constructed such that the optical path of the auxiliary finder B is led nearly on the real image forming plane into a part of the optical path of the main finder A.

As shown in FIG. 1, the erect real image forming optical system of the auxiliary finder B in this first embodiment is constructed of a combination of reflecting members, specifically comprising a full-reflecting mirror 4, a reflecting member 5 of two rectangular prisms, and another full-reflecting mirror 6. Here, one of the reflecting members, that is, the full-reflective mirror 6 is made to be pivotable and retractable about a pivoting axis $6a$ so as to change the reflection angle.

Consequently, according to the finder optical system of this first embodiment, as shown in FIG. 2, not only a view field A' is seen through the main finder A but also another view field B' through the auxiliary finder B can be observed at the lower part in the same frame of the view finder A'.

More specifically, in FIG. 1, a light beam from a subject going into the auxiliary finder objective lens 3 of the auxiliary finder B is deflected upwardly on the full-reflecting mirror 4, going into the reflecting member 5, to thereby be reflected on the full-reflecting mirror 6 pivotable about the pivotable axis $6a$. The reflected light beam further travels through the condenser lens 7 and the eyepiece 8 of the main finder A in succession using partly the respective members thereof. Thus traveled light beam is observed as an erect real image through a finder frame of the camera.

Since the main finder A is arranged such that the optical axis $O_4$ of the main finder objective lens 2 crosses the vertical lens axis $O_2$ at right angles and is in parallel with the image pickup lens optical axis $O_3$, the view field A' observed through the main finder A is free from parallax in both right and left directions.

In addition, since the auxiliary finder B is arranged such that the optical axis $O_5$ of the auxiliary finder objective lens 3 crosses the lateral lens axis $O_1$ at right angles and is in parallel with the image pick up lens optical axis $O_3$, the view field B' observed through the auxiliary finder B is free from parallax in both the up and down directions.

Further, since the erect real image forming optical system in the auxiliary finder B is constructed such that the optical path of the auxiliary finder B is led nearly on the real image forming plane into a part of the optical path from the main finder A, and the auxiliary finder B shares the same ocular system with the main finder A, the observer observes both the horizontally parallax-free view field and vertically parallax-free view field simultaneously to know a parallax-free image frame.

Now, the pivotable mechanism of the full-reflecting mirror 6 in the ocular system will be detailed with reference to FIGS. $3a$ and $3b$.

FIG. $3a$ shows a case where the condenser lens 7 is disposed keeping a distance from an image forming plane 9 being indicated by a broken line, whereas FIG. $3b$ shows the case where the condenser lens 7 is disposed closely to an image forming plane 9 indicated by a broken line.

In the each finder optical system, a free end $6b$ of the full-reflecting mirror 6 is designed to be positioned closely to, or adjoining, the image forming plane 9 of the main finder A. By this arrangement in the finder optical system, it is possible to diminish the overlap between the view fields A' and B'.

Further, the full-reflecting mirror 6 is designed to be pivotable about the pivoting axis $6a$. More specifically, the full-reflecting mirror 6 is pivoted in the direction of an arrow a in the case of FIG. $3a$, whereas the full-reflecting mirror 6 is turned over in the direction of an arrow b in the case of FIG. $3b$. Consequently the full-reflecting mirror 6 can be withdrawn from the optical path of the main finder A by the revolution thereof with respect to the pivoting axis $6a$, thus enabling the observer to observe only the view field A' of the main finder A.

As a result, according to the finder optical system of this embodiment, when the parallax is negligible, that is, the subject is located enough away from the camera, the observation is made using only the view field A', whereas when the parallax is not negligible, that is the subject is located close to the camera, the observation can be made by using both the view fields A' and B', in order that the observer knows the proper taking image frame.

The second embodiment of the present invention will be described hereinafter.

Figure 4:
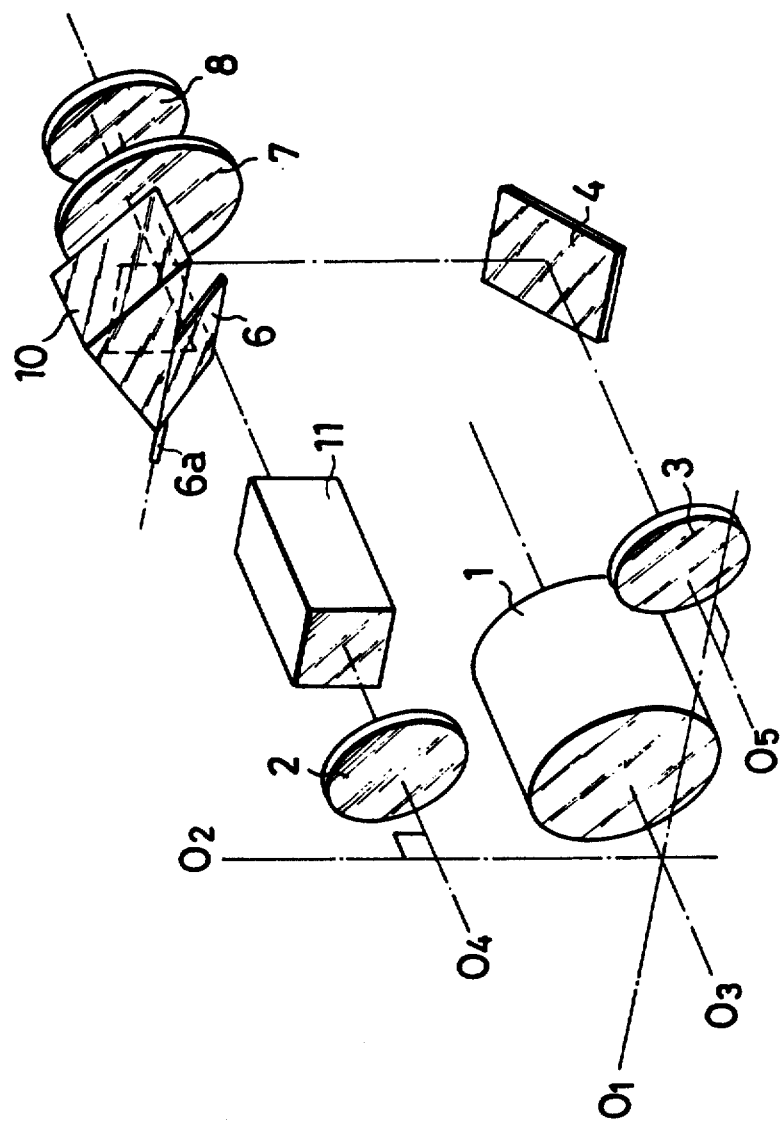
FIG. 4 is a schematic perspective view of a finder optical system of the second embodiment according to the present invention.

The erect real image forming optical system of the auxiliary finder B in the second embodiment is constructed of combination of reflecting members comprising, as shown FIG. 4, a full-reflecting mirror 4, a reflecting member 10 of a single rectangular prism, and a full-reflecting mirror 6. Here, one of the reflecting members, that is, the full-reflecting mirror 6 is pivotable and retractable about a pivoting axis 6a, similarly with the first embodiment, to be able to change the reflection angle.

Figure 5:
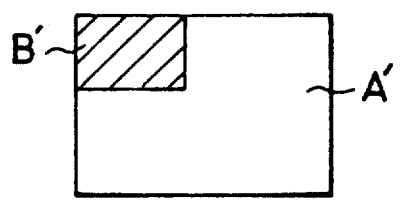
FIG. 5 is a schematic view of a view field of the finder of the second embodiment according to the present invention.

According to the finder optical system of this second embodiment, as shown in FIG. 5, not only a view field A' is seen through the main finder A but also another view field B' through the auxiliary finder B can be observed at the upper part in the same frame of the view finder A'.

More specifically, in FIG. 4, a light beam from a subject going into the auxiliary finder objective lens 3 of the auxiliary finder B is deflected upwardly on the full-reflecting mirror 4, going into the reflecting member 10, then to be reflected on the full-reflecting mirror 6 pivotable about the pivoting axis 6a. The reflected light beam further travels through the condenser lens 7 and the eyepiece 8 of the main finder A in succession using partly the respective members. Thus traveled light beam is observed as an erect real image through the finder frame of the camera.

Here, since the main finder A is arranged such that the optical axis $O_4$ of the main finder objective lens 2 crosses the vertical lens axis $O_2$ at right angles and is in parallel with the image pickup lens optical axis $O_3$, the view field A' observed through the main finder A has similarly with the first embodiment, is free from parallax in both the right and left directions.

In addition, since the auxiliary finder B is arranged such that the optical axis $O_5$ of the auxiliary finder objective lens 3 crosses the lateral lens axis $O_1$ at right angles and is in parallel with the image pickup lens optical axis $O_3$, the view field B' observed through the auxiliary finder B is free from parallax in both the up and down directions.

Further, since the erect real image forming optical system in the auxiliary finder B is constructed such that the optical path of the auxiliary finder B is led nearly on the real image forming plane into a part of the optical path from the main finder A, this allows, similarly with the first embodiment, the auxiliary finder B to share the same ocular system with the main finder A, and enables the observer to observe both the laterally parallax-free view field and vertically parallax-free view field simultaneously to know a parallax-free image frame.

Further, according to the second embodiment, the full-reflecting mirror 6 can be withdrawn from the optical path of the main finder A by the revolution thereof with respect to the pivoting axis 6a, thus allowing, in the same manner as in the first embodiment, the observer to observe only the view field A' of the main finder A.

As a result, according to the finder optical system of this embodiment, when the parallax is negligible, that is, the subject is located enough away from the camera, the observation is made using only the view field A', whereas when the parallax is not negligible, that is the subject is located close to the camera, the observation can be made by using both the view fields A' and B', in order that the observer knows the proper taking image frame.

Many widely different embodiments of the present invention may be constructed without departing from the spirit and scope of the present invention. It should be understood that the present invention is not limited to the specific embodiments described in the specification, except as defined in the appended claims.

What is claimed is:

1. A finder optical system of a camera, comprising:
   a main finder constructed by a real image type finder having a main finder objective lens, an ocular lens system, and an optical system disposed between said main finder objective lens and the ocular lens system for forming an erect real image, an optical axis of said main finder objective lens being perpendicular to a vertical symmetry axis of an image pickup lens of said camera and being parallel to an optical axis of said image pickup lens; and
   an auxiliary finder constructed by a real image finder having an auxiliary finder objective lens and another optical system disposed between said auxiliary finder objective lens and said ocular lens system for forming an erect real image, an optical axis of said auxiliary finder objective lens being perpendicular to a lateral symmetry axis of said image pickup lens and being parallel to said optical axis of said image pickup lens,
   said another optical system being adapted in such a manner that an optical path of said auxiliary finder is led nearly on a real image forming plane of said main finder into a part of an optical path of said main finder.

2. A system according to claim 1, wherein said optical axis of said main finder objective lens crosses said vertical symmetry axis of said image pickup lens.

3. A system according to claim 1, wherein said optical axis of said auxiliary finder objective lens crosses said lateral symmetry axis of said image pickup lens.

4. A system according to claim 1, wherein said optical system comprises a combination of reflecting members.

5. A system according to claim 4, wherein said reflecting members comprise a full-reflecting mirror, a reflecting rectangular prism member, and another full-reflecting mirror.

6. A system according to claim 5, wherein said another full-reflecting mirror is made to be pivotable and retractable about a pivoting axis thereof so as to change a reflection angle.

7. A system according to claim 5, wherein said reflecting rectangular prism member comprises two rectangular prisms.

8. A system according to claim 5, wherein said reflecting rectangular prism member comprises a single rectangular prism.

* * * * *